(No Model.)  3 Sheets—Sheet 1.

R. & J. GARSED & W. MASON.
WARP LINKING MACHINE.

No. 396,554.  Patented Jan. 22, 1889.

Witnesses:
John E. Parker.
William D. Connor.

Inventors:
Richard Garsed,
Joshua Garsed, &
William Mason
by their Attorneys
Howson Sons (No Model.) 3 Sheets—Sheet 2.
R. & J. GARSED & W. MASON.
WARP LINKING MACHINE.
No. 396,554. Patented Jan. 22, 1889.
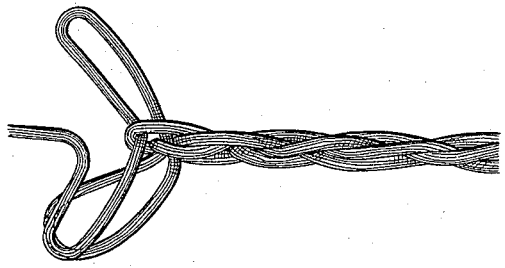
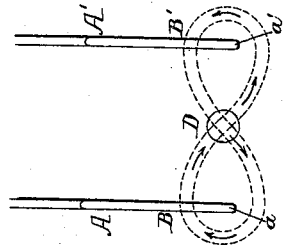
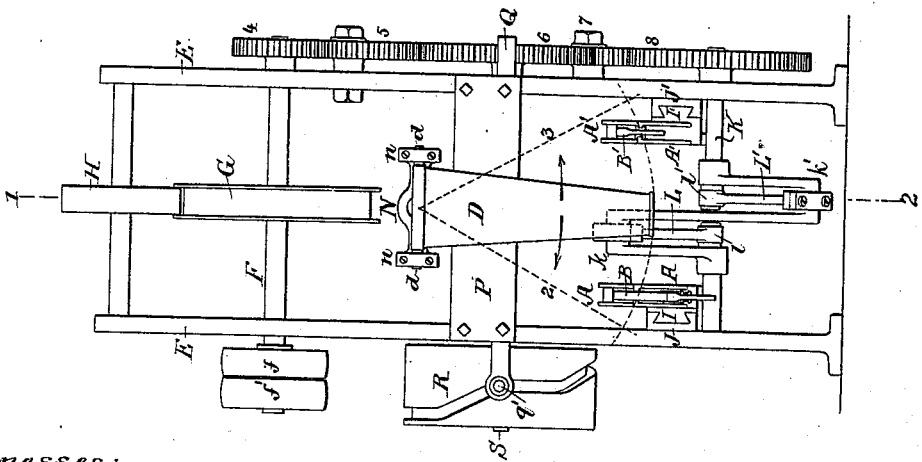
Witnesses:
John E. Parker
William D. Conner.
Inventors:
Richard Garsed,
Joshua Garsed, &
William Mason,
by their Attorneys
Howson & Sons (No Model.) 3 Sheets—Sheet 3.

R. & J. GARSED & W. MASON.
WARP LINKING MACHINE.

No. 396,554. Patented Jan. 22, 1889.

Witnesses:
John S. Parker
William D. Conner

Inventors:
Richard Garsed,
Joshua Garsed &
William Mason
by their Attorneys
Howson & Sons

UNITED STATES PATENT OFFICE.

RICHARD GARSED, JOSHUA GARSED, AND WILLIAM MASON, OF PHILADELPHIA, PENNSYLVANIA.

WARP-LINKING MACHINE.

SPECIFICATION forming part of Letters Patent No. 396,554, dated January 22, 1889.

Application filed April 11, 1887. Serial No. 234,388. (No model.)

*To all whom it may concern:*

Be it known that we, RICHARD GARSED, JOSHUA GARSED, and WILLIAM MASON, all citizens of the United States, and residents of Philadelphia, Pennsylvania, have invented certain Improvements in Warp-Linking Machines, of which the following is a specification.

The object of our invention is to form by machinery a double-linked warp similar to that now made by hand, our invention being an improvement upon the machine shown in the Patent No. 25,501, granted September 20, 1859, to Richard Garsed and Clayton Denn. This machine formed what is called a "single-linked warp," which, however, is objectionable, as it is inconvenient to dye, the warp being loose and the links long and thin, whereas a double-linked warp is compact and thick, the links being close together and the chain of warp only about one-half as long as that of a single-linked warp.

Figure 2:
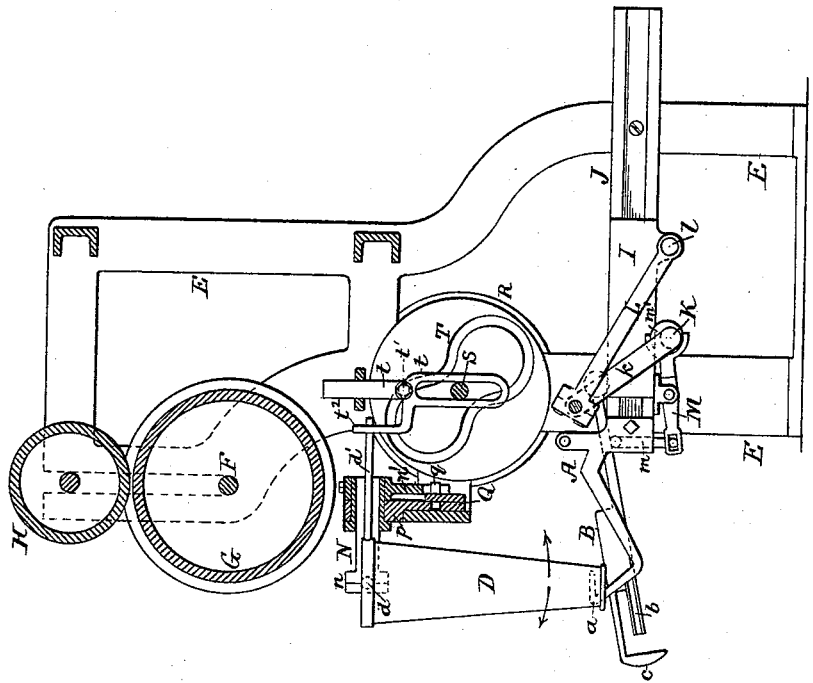
Figure 1:
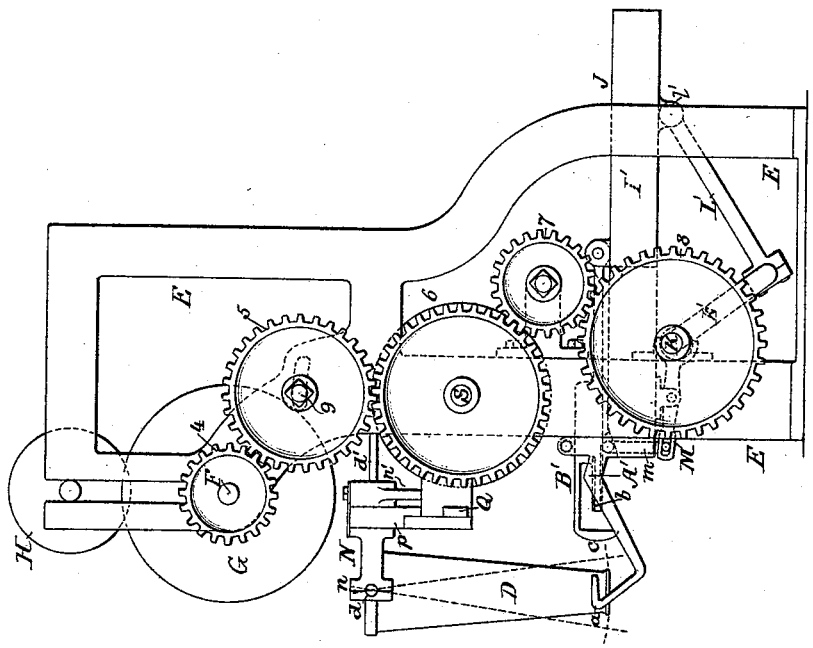

In the accompanying drawings, Figure 1 is a side view of our improved double-linking device, which is secured to or forms part of a machine similar to that illustrated in the above-mentioned patent. Fig. 2 is a section on the line 1 2, Fig. 3. Fig. 3 is a front view of the device with parts of the operating mechanism omitted to avoid confusion, and Figs. 4 to 9 are diagrams illustrating the operation of the linking devices.

Referring to the diagrams, A A' are two arms, and B B' two fingers, which slide in the arms, said arms and fingers being precisely alike and similar to the single arm and finger of the patent above referred to.

Figure 8:
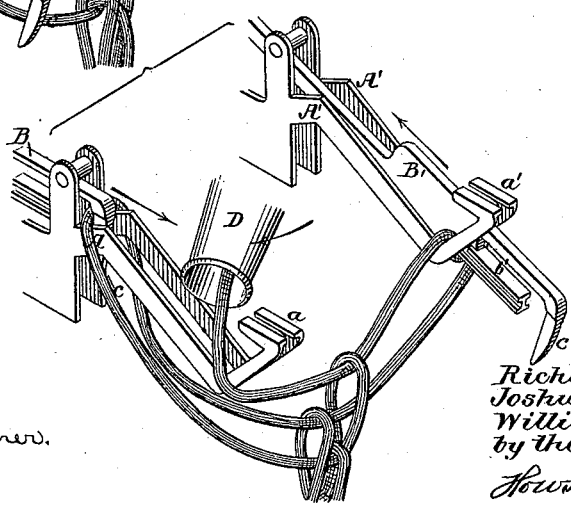

A short distance above these arms is suspended a tube or funnel, D, the lower end of which is caused to move in a path similar to a figure 8, and shown by dotted lines in Fig. 4, the end of the tube first passing around the outside of the end $a$ of the arm A, then returning back of the point of said arm to the central position, then passing outside the point $a'$ of the arm A, and then returning back of the point $a'$ of said arm to the central position, while the fingers B B' have a reciprocating motion, one finger being fully projected when the other finger is fully retracted.

Figure 5:
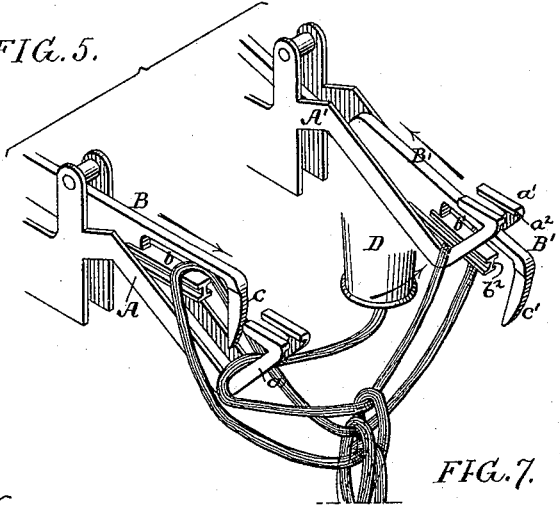

Referring to Fig. 5, it will be seen that the tube D is in the central position, the finger B on its outward movement, and the finger B' on its inward movement. A loop of warp-thread has been placed on the hooked end of the arm A, and the projecting portion $b$ of the finger B is in the act of throwing a previously-formed loop over the same, while a loop of warp is resting on the other arm, A', and the hooked projection $c'$ of the finger B' is in the act of taking this loop of warp and drawing it up to the position shown in Fig. 6, the finger B of the arm A having then been projected beyond the point $a$ of the arm A so as to throw the previously-formed loop over the loop just hung on said arm A, as shown.

Figure 6:
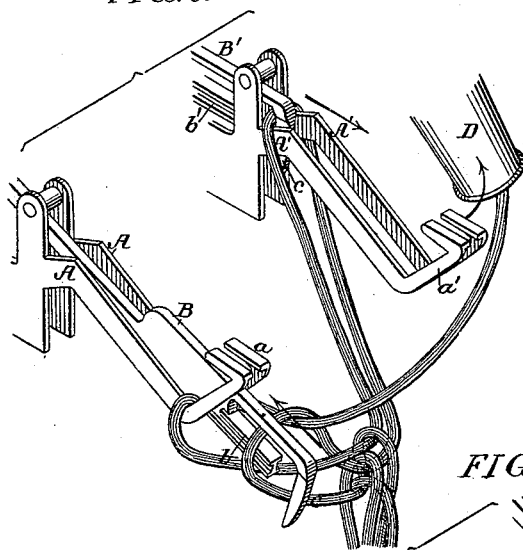
Figure 7:
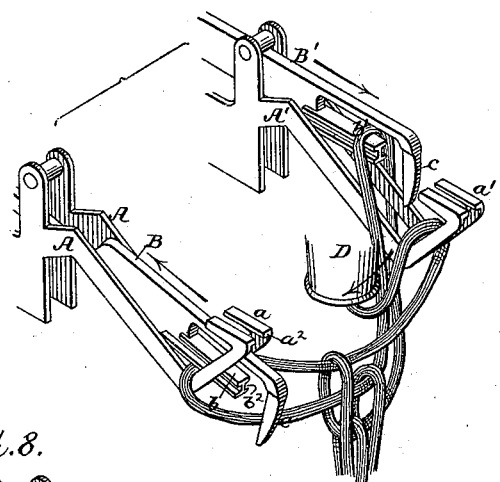

On the return movement of the finger B the loop on the portion $b$ of the finger B will be pushed off, as shown in Fig. 7, and the hooked portion $c$ will engage with the loop hung on the arm A. In the meantime the tube D has passed around the end $a'$ of the arm A', as shown in Figs. 6 and 7, and placed a loop of warp on said arm A'.

On the forward movement of the finger B' its portion $b'$ carries the old loop previously formed on the arm over this newly-formed loop, the action being the same as the previously-described action of the finger B. Referring again to the arm A and its finger, the portion $c$ of said finger, as the latter is retracted, draws a loop on the arm A to the position shown in Fig. 8, and a new loop is placed over the finger, as shown, by the tube D. As each finger is retracted, the loop drawn back thereby is caused to ascend the inclined portion of the corresponding arm, and is deposited on the reverse incline at the top of said arm, as set forth in the patent referred to above, so that when the finger is again projected the loop will be in position to be caught by the portion $b$ or $b'$ of said finger, and thus supported above the hooked outer end of the arm, over which it is thrown by the finger.

The above-described operation produces what is termed a "double-linked warp," as shown in the diagram, Fig. 9.

We have thought it best to first describe the operation of the main parts of the machine before describing the operating mechanism therefor, which is shown in Figs. 1, 2, and 3.

E E are the side frames of the machine, which are mounted on a beam and situated in respect to the warping-machine and its spools in precisely the same manner as in the aforesaid patent.

F is the main driving-shaft, having fast and loose pulleys $f\ f'$, and on this shaft is the wheel G for feeding the warp to the linking devices.

H is a presser-wheel above the feed-wheel G, the journals of this wheel H being adapted to vertical slots in the frame, so that the wheel can rise and fall to suit different thicknesses of yarn.

The fingers B B' are pivoted to slides I I', which are guided in V-shaped bearings J, attached to the side frames, E E, and K is a crank-shaft having two cranks, $k\ k'$, diametrically opposite to each other, the pin of the crank $k$ being connected by a rod, L, to a pin, $l$, on the carriage I, and the pin of the crank $k'$ being connected by a rod, L', to a pin, $l'$, on the carriage I', so that when one carriage is at the limit of its outward movement the other carriage will be at the limit of its rearward movement.

The arms A A', which are secured to the outer ends of the bearings J, are of the peculiar shape shown, and the fingers B B' have projections $b\ b'$, the edges of which are grooved at $b^2$ for the reception of rails $a^2$ on the hooked points $a$ of the arms, the projections traveling on these rails as the finger is approaching the limit of its outward movement, but dropping from the rails before it reaches this limit. Each of the fingers B B' at a certain point in its rearward movement is lifted by a pin, $m$, sliding in an opening in the arm A and having a friction-roller at its upper end, this pin being actuated by an eccentric, $m'$, on the shaft K, through the medium of a lever, M, pivoted to a bearing on the under side of the guide J. The eccentrics $m'$ for each finger are precisely alike, but are set opposite to each other to accord with the set of the cranks.

The pins $m$, levers M, and eccentrics $m'$ are omitted from the front view, Fig. 3, as it is thought that their illustration in this view would tend to confuse and render obscure the parts of the operating mechanism which are there illustrated.

As before remarked, the lower portion of the tube D has a motion in the form of a figure 8. The vibrating motion to right and left, as shown by the arrows, Fig. 3, is effected in the following manner: The upper portion of the tube D has two journals, $d\ d$, which are adapted to bearings $n\ n$ on a swiveled bracket, N, which has its bearing in a block, $p$, secured to a brace-bar, P, extending from one frame, E, to the other, as shown in Fig. 3. To the rear end of the swiveled bracket N we secure a slotted arm, $n'$, which engages with a pin, $q$, on a reciprocating bar, Q, the latter having a pin, $q'$, which engages with a slot in a cam, R, secured to a shaft, S, having its bearings in the frame of the machine. This cam moves the tube D from its central position to the position shown by the dotted lines 2, Fig. 3, and then returns the tube to said central position and permits it to rest for a short time in this position, after which the tube is moved to the position shown by the dotted line 3 and then to the central position, from which, after a proper dwell, it is again moved to the position shown by the dotted line 2, and so on. In the meantime a slotted cam, T, also on the shaft S, vibrates the tube in the direction of the arrows, Fig. 2—that is to say, in a direction at right angles to the vibrations just described—the tube having an arm, $d'$, which passes through an orifice in an arm, $t^2$, of the vertical reciprocating bar $t$, having a pin, $t'$, engaging with the slot of the cam T, as shown in Fig. 2.

On the driving-shaft F is a gear-wheel, 4, meshing with a wheel, 5, mounted on a stud, 9, adjustable in a slot in the frame. This wheel 5 gears with a wheel, 6, on the cam-shaft S, and this wheel in turn is geared with a wheel, 8, on a crank-shaft, K, through an intermediate wheel, 7, on a stud mounted on a bracket secured to the frame, as shown fully in Fig. 1. By having the wheel 5 adjustable the wheel 4 can be replaced by a wheel of any desired size, and thus the speed of the linking devices can be varied in respect to the rate of delivery of the warp, the length of link being thus graduated to suit the bulk of the warp which is being linked.

We claim as our invention—

1. The combination, with opposite loop-supporting arms and means for looping a warp around first one arm and then the other, of a reciprocating finger co-operating with each of said arms, provided with a hook for engaging the loops as laid upon the arm and drawing the same rearwardly thereon, and with a projection for lifting said loops and throwing them over the end of the arm in the forward movement of the finger, and means for actuating said fingers alternately, subtantially as described.

2. The combination, with opposite loop-supporting arms and means for looping a warp around first one arm and then the other, of a reciprocating finger co-operating with each of said arms, provided with a hook for engaging the loops as laid upon the arm and drawing the same rearwardly thereon, and with a projection for lifting said loops and throwing them over the end of the arm in the forward movement of the finger, and means for reciprocating said fingers alternately and raising the free ends thereof after engagement of the throwing-off projections with the loops, all substantially as set forth.

3. The combination of the loop-supporting arm A, a reciprocating slide, a linking-finger pivoted thereto, a pin, $m$, acting on said finger, and means for reciprocating said pin, all substantially as and for the purpose described.

In testimony whereof we have signed our names to this specification in the presence of two subscribing witnesses.

RICHARD GARSED.
JOSHUA GARSED.
WILLIAM MASON.

Witnesses:
EDWIN STEARNE,
PHILIP R. D. WELLS.